(12) United States Patent
Arsikere et al.

(10) Patent No.: US 6,970,429 B2
(45) Date of Patent: Nov. 29, 2005

(54) METHOD AND APPARATUS FOR MEASURING INTERNET ROUTER TRAFFIC

(75) Inventors: Amarnath R Arsikere, Mt. Prospect, IL (US); Sergei P. Degtiarev, Wheeling, IL (US)

(73) Assignee: Teradyne, Inc., Boston, MA (US)

( * ) Notice: Subject to any disclaimer, the term of this patent is extended or adjusted under 35 U.S.C. 154(b) by 923 days.

(21) Appl. No.: 09/872,958

(22) Filed: Jun. 1, 2001

(65) Prior Publication Data
US 2001/0053129 A1 Dec. 20, 2001

Related U.S. Application Data

(60) Provisional application No. 60/209,057, filed on Jun. 2, 2000.

(51) Int. Cl.$^7$ .............................................. H04L 12/26
(52) U.S. Cl. ..................................... 370/244; 370/253
(58) Field of Search ................................ 370/216, 229, 370/232, 235, 236–238, 241, 242, 247, 248, 370/251, 252, 253, 241.1, 250, 236.1, 236.2, 370/389, 244; 379/1.01, 1.03, 1.04, 26.01, 379/27.01; 398/9, 12

(56) References Cited

U.S. PATENT DOCUMENTS

| 5,545,291 A | 8/1996 | Smith et al. |
| 6,064,654 A * | 5/2000 | White-Hauser ............. 370/248 |
| 6,363,053 B1 * | 3/2002 | Schuster et al. ............ 370/230 |
| 6,466,548 B1 * | 10/2002 | Fitzgerald .................... 370/249 |

OTHER PUBLICATIONS

Mathis M; "Windowed ping: an IP layer perforemance diagnostic" Computer Networks and ISDN Systems, North Holland Publishing. Amsterdam, NL, vol. 27, No. 3, Dec. 1, 1994, pp. 449-459, XP004037978 ISSN: 0169-7552 p. 451, left-hand column, line 3; right-hand column, line 6.

* cited by examiner

Primary Examiner—Wellington Chin
Assistant Examiner—Brenda Pham

(57) ABSTRACT

A method and test system for measuring traffic at nodes in a network. The test system is used in a call center and allows the call center operator to determine traffic loading at network nodes even when in different administrative domains.

19 Claims, 4 Drawing Sheets

METHOD AND APPARATUS FOR MEASURING INTERNET ROUTER TRAFFIC

RELATED APPLICATION DATA

This application claims priority to provisional application No. 60/209,057 filed Jun. 2, 2000, entitled "Method and Apparatus for Measuring Internet Router Traffic" by Arsikere, et al.

BACKGROUND

This invention relates generally to data networks and more specifically to performance measurements on data networks.

The Internet is an example of a large and widely used data network. The Internet interconnects many computers often owned by different entities, creating the ability for widespread information exchange. The computers connected by the network are sometimes called "nodes". The nodes might take the form of "routers" or "servers".

A server is generally a node that runs an application. Often it provides information when requested. But the server could run programs on data or store data in response to user commands.

In contrast, a "router" is a computer that is connected to many other nodes and passes data messages in the direction of an intended destination computer. All nodes on the Internet communicate using Internet Protocol (IP). Under the Internet Protocol, messages are broken up into "datagrams" or "packets" of data. Each datagram follows a prescribed format. One of the prescribed fields is a destination address. Each node has an address assigned to it and the destination address allows a computer to be specified to receive a particular datagram of data. The router reads the destination addresses of datagrams. If a computer with that address is attached to the router, the message can be sent directly to that computer.

If the destination computer is not attached to a router that receives the datagram, the router can pass the datagram on to another router. Sometimes, though, a datagram never reaches its destination address. It is possible that the datagram contains an error and specifies a non-existent address. Or the server at the destination address might not be functioning. Or, the path to the destination address might be blocked. If there were no way to eliminate such datagrams from the network, the number of such datagrams would build up over time. Ultimately, all the routers on the network would do nothing but send datagrams that could not reach their destinations.

To avoid this, the Internet Protocol requires that each datagram contain a source address and field called "Time To Live" or TTL. The TTL field is a counter that is initially set to a value between 1 and 255. Each time the message is sent from one router to the next, the TTL field is reduced by 1. When the TTL field reaches 1, the message is not passed on to another router. Rather, that router creates a new message that has in its destination field the address of the source of the old message. This message contains data that signals to the source of the first message that the datagram did not receive the message because it took too long to find a path to the destination address.

In addition, each datagram has an identification number. In general, each source will increment the identification number field by one for each datagram that it sends. The identification number helps the original source computer identify which datagram was not received. It was intended to be used by transport layer protocols, however it is not used by any of existing implementations. As will be described in greater detail below, this field may also be used in a novel way to measure response time of a network.

Using the Internet Protocol, many computers, operated by different entities, can all communicate. However, the distributed nature of the Internet also creates special challenges when things do not work right.

A user attempting to exchange information with a particular computer over the Internet has to transmit messages through several "administrative domains." An administrative domain represents a portion of the network managed by a particular entity. If the communication fails or takes too long, a user might have difficulty knowing where the problem resides.

At a high level, traditional Internet communication can be thought of as passing hrough five administrative domains. A consumer has a computer, such as a PC. The PC represents one administrative domain because it is under the control of the user. The PC is connected to the Internet through an access provider network. The access provider network is administered by an access provider, such as the local phone company or DSL provider. The access provider network enables communication with an Internet Service Provider (ISP). The ISP maintains an ISP network that provides a connection to the Internet. Within the Internet, routers pass messages to enable communication with servers. Many entities control individual routers in the internet, but the Internet as a whole can be thought of as one administrative zone. The server is generally under control of a single company or entity, which represents yeat a further administrative domain.

If a consumer experiences a problem communicating with a particular server, the consumer will often not know where the problem lies. However, the consumer often pays the access provider or ISP for service. When the user experiences problems, the consumer will often call a call center run by the access provider or ISP.

It would be very desirable if the call center operator could provide fast and accurate information about the source of the problem. If the problem resides in the administrative zone controlled by the entity that runs the call center, it would be desirable to quickly identify the problem and make arrangements to have it repaired. But, where the problem resides elsewhere, it would be desirable to be able to identify that the problem resides in a different administrative domain. Timely information would reduce the burden on the company running the call center and also reduce customer frustration.

Some tools are available to diagnose a network problem. "PING" is a network tool that is often installed on networked computers. The PING tool sends a message to a particular computer and determines whether a response is received. This tool can verify that a connection exists. But, if no connection exists, the tool can not provide an indication of the source of the problem. Nor will the tool be able to identify the source of a bottleneck or similar problem that slows, but does not block, communication.

Traceroute is another such tool. Traceroute uses the time to live field in IP datagrams. A source running traceroute will send multiple datagrams to a particular destination. In the first datagram, the time to live field will be set to 1. This causes the datagram to expire at the first router in the path. That router sends back a "datagram expired" message. The message includes in its header the address of the router that sent it, which tells the first router in the path. The source running traceroute sends another datagram, with the time to live field incremented by one. This datagram will expire at the next router in the path and a "datagram expired" message will be generated by that router. As successive datagrams are sent, with successively higher values of time to live, successive routers in the path respond, providing their IP addresses to the source. At some time to live value, the datagram will reach the destination computer before expiring. That computer will respond to the trace route message with a "Destination Unreachable/Port Unreachable" message. In this way, the source can determine the address of every router in the path to the destination. However, traceroute only provides the path to a particular computer. It does not provide any indication of whether performance is being hindered by excessive traffic at one of the nodes in the path.

Performance information might be obtained through the use of SNMP information stored in the routers in the path. Routers generally store information about the messages they pass. Statistics about the volume of traffic might, for example, reveal a particular router is overloaded and is therefore the bottleneck. However, a problem with employing SNMP tools is that they are available only to users who have administrative privileges on the router being tested. Because the routers are usually in an administrative zone operated by an entity other than the one that operates the call center, it is unlikely that the appropriate access to the router will be available to use these tools.

SUMMARY OF THE INVENTION

With the foregoing background in mind, it is an object of the invention to provide tools to identify performance-affecting problems on a computer network.

The foregoing and other objects are achieved according to a method that includes sending multiple datagrams of data having time to live fields that cause the messages to time out at a particular router in the network. The time of sending the datagrams and the time of receiving the time out messages are recorded. Fields in the time out message are examined to determine the number of datagrams sent by the router between the two messages, allowing the load on that router to be determined.

In a preferred embodiment, the time to live field is successively increased so that the load at various routers in a path can be tested to search for a bottleneck.

Further, in the preferred embodiment, the diagnostic messages are sent by a diagnostic device attached to the network. The destination address in the datagrams corresponds to the address of a particular server with which a user reported having problems communicating.

BRIEF DESCRIPTION OF THE DRAWINGS

The invention will be better understood by reference to the following more detailed description and accompanying drawings in which.

DESCRIPTION OF THE PREFERRED EMBODIMENT

Figure 1:
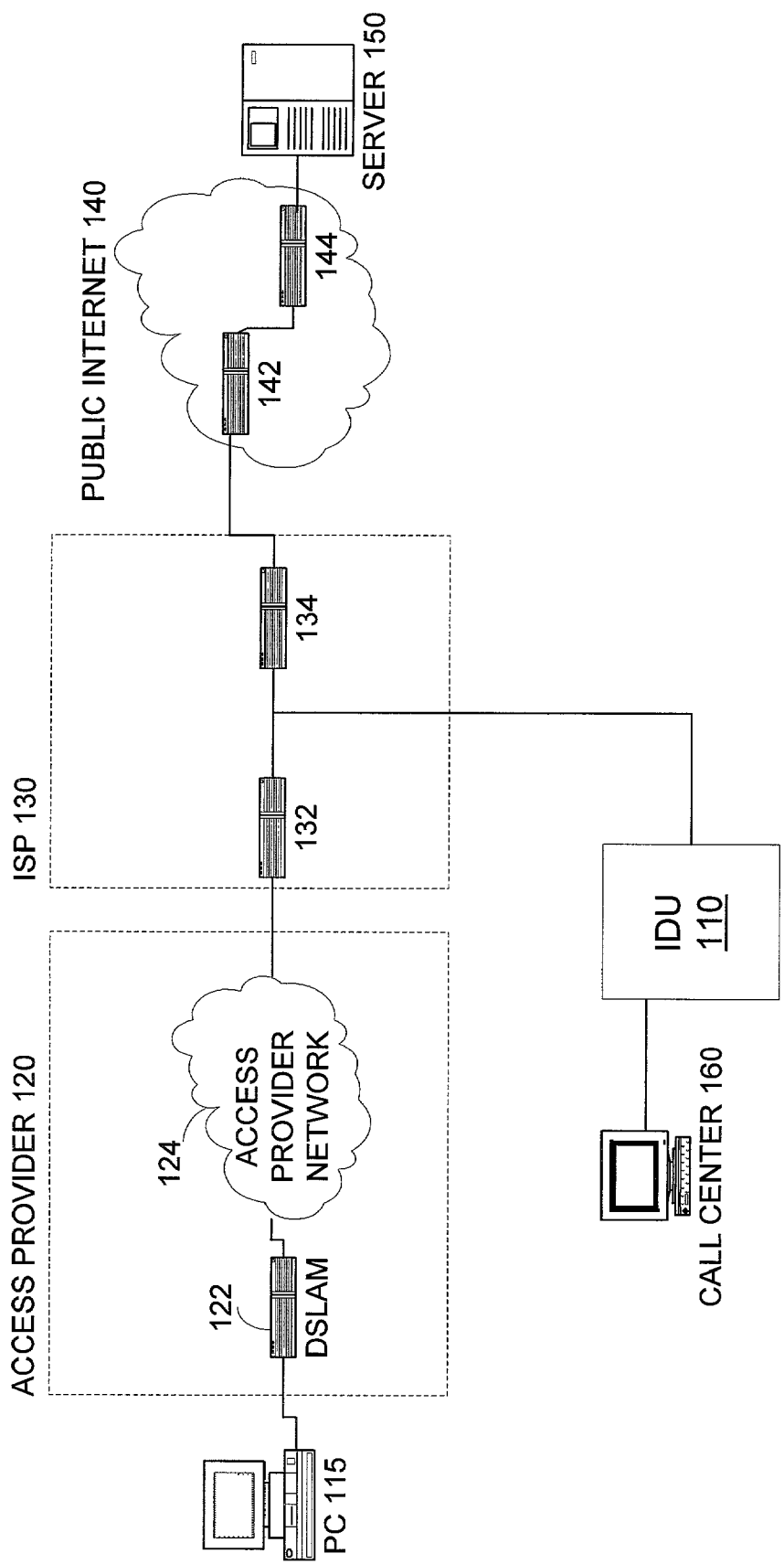
FIG. 1 is a block diagram of a network containing a diagnostic system including a method of measuring router traffic.

FIG. 1 illustrates a computer network. In the preferred embodiment, the computer network is the Internet 100. However, the invention might be employed with other networks, such as WANs or enterprise wide networks.

Internet 100 includes a consumer network. For simplicity, the consumer network is illustrated as simply a PC 115. However, the consumer network could include multiple computers, workstations, routers, hubs and other switching devices. It should also be appreciated that many consumers use the Internet, so there are many computer networks. However, only one consumer network is shown for simplicity.

PC 115 is connected to an access provider network 120. An access provider network could take many forms and the specific type of access provider network is not important to the invention. For example, the access provider network could be the public switched telephone network or a dedicated phone line. In the illustrated embodiment, access provider network 120 is a DSL phone network. It includes digital subscriber loop access module (DSLAM) 122 and a data network 124 that routes messages in digital form. In the illustrated embodiment, access provider data network 124 communicates using Internet Protocol. DSLAM 122 creates datagrams that incorporate data sent by consumer PC 115 or provides datagrams to consumer PC 115. DSLAM 122 could be thought of as the first node in an overall computer network. Preferably, data network 124 employs known network components. Those components could include additional routers or other network nodes. However, for simplicity, no additional nodes are shown in FIG. 1.

Access provider network 120 connects consumer PC 115 to Internet Service Provider network 130. ISP network 130 is sometimes called a Point of Presence or POP and is as known in the art. In FIG. 1, ISP network 130 includes an ingress router 122 and an egress router 134. Datagrams coming from and going to the Public Internet Network 140 are appropriately directed through routers 132 and 134.

Datagrams are then passed to the public Internet network 140. The public Internet includes multiple nodes. For simplicity, just routers 142 and 144 are shown. However, it will be appreciated that the public Internet includes many other routers and nodes of other types.

Ultimately, one of the routers connects to a server network 150. The server network could also include many nodes, including routers and other types of computers. For simplicity, server network 150 is shown as a single server. The server is as is known in the art. For the description of the preferred embodiment given herein, server 150 is a computer that hosts a web page that a consumer accesses from consumer PC 115, but servers that perform other applications could be used.

Internet 100 is also shown as including a diagnostic unit 110. Internet Diagnostic Unit (IDU) 110 could be a computer connected to the network as is known in the art. It can send and receive messages in the appropriate format for the network 100.

IDU 110 is illustrated as part of a customer call center 160. As is known in the art, human operators at a call center receive calls from consumers experiencing problems with a service. In the illustrated example, IDU 110 is shown connected to ISP network 130 and customer call center is likely managed by the Internet service provider that manages ISP network 130.

One of the functions that IDU 110 is programmed to perform an internet traffic router load test according to the method described in greater detail below. Such a test might be run, for example, in response to a command from the customer call center operator in response to a complaint that a particular customer can not access a particular web site. In the preferred embodiment, IDU 110 is a server on Internet 100 with a particular destination address. A consumer can access the IDU 110 in the same manner that it can access other servers.

Messages sent by the user to IDU 110 identify a particular node on the Internet that the consumer has had difficulty accessing. IDU 110 then sends messages onto the Internet to determine if there are bottlenecks reaching that server that are causing the performance problem perceived by the customer. A bottleneck might be caused by a large number of datagrams being processed by a router in a short period of time.

Figure 2:
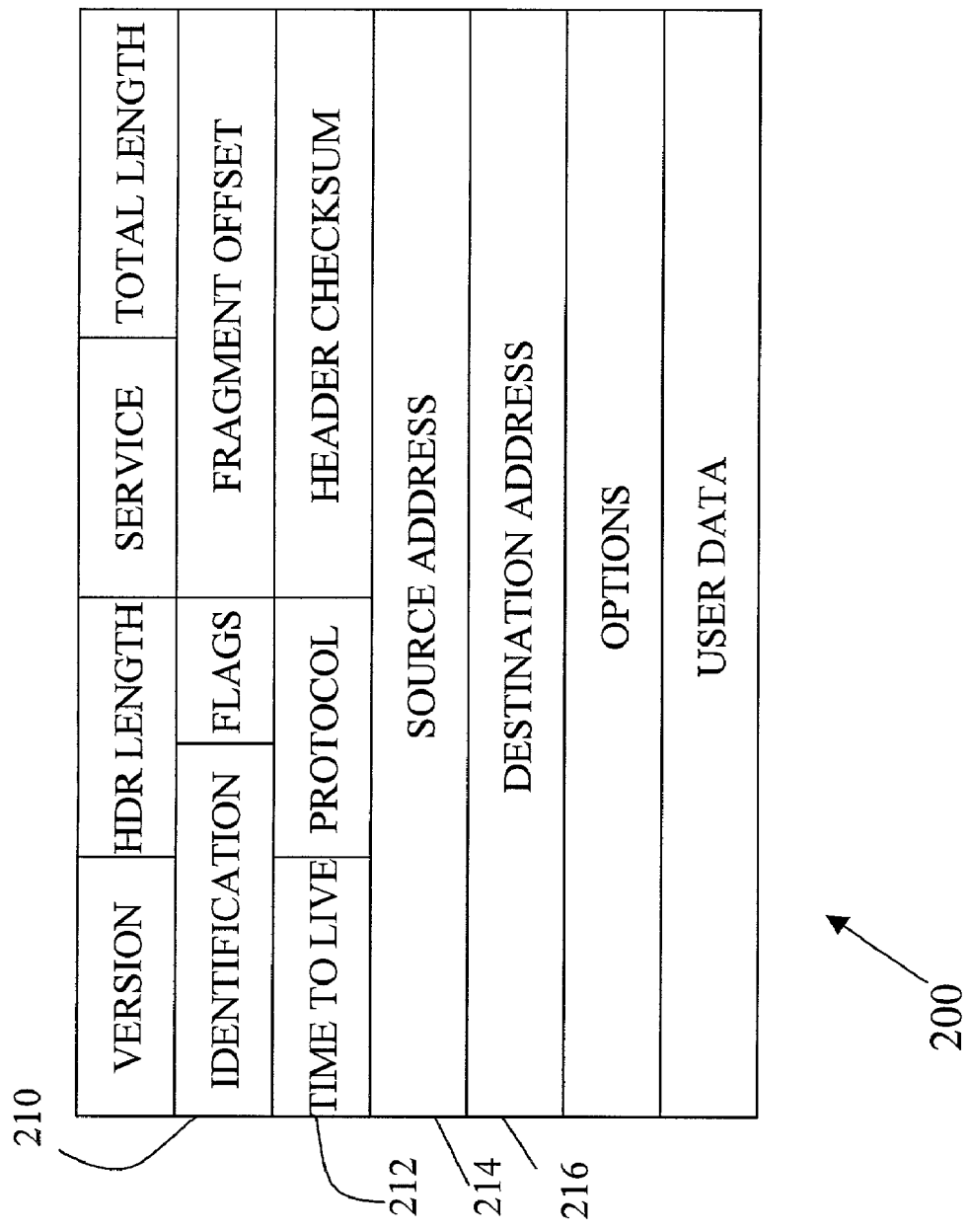
FIG. 2 is a sketch illustrating a datagram in Internet Protocol.

To better explain the method of measuring router traffic, FIG. 2 illustrates a datagram 200 in Internet Protocol. Datagram 200 includes multiple data fields. The message includes a header portion and a data portion. The header provides the information needed to route the datagram through the network. The destination address is specified in field 216. The source address of the computer generating the message is specified in field 214.

Field 210 contains an identifier for the datagram. According to the protocol, each time a computer generates a datagram, it should provide a different identifier in field 210. Each field has a defined number of bits. In the IP protocol, the identifier field has 16 bits. It generally takes $2^{16}$ datagrams until a node sends a datagram with the same value in identifier field 210.

According to the official definition of the IP protocol, the value in the identifier filed 210 should be set by the upper layer of the transmission protocol. For example, a computer that communicates in both TCP/IP and UDP/IP could generate messages with the same identification fields. However, we have discovered that nearly all commercial hardware that implements IP protocol is designed so that the identifier is set at the IP layer. And, a unique value in identifier field 210 is ensured by incrementing the value placed in the field by one for each datagram sent.

Thus, the value in identification field 210 provides a convenient way to determine the number of datagrams that have been sent by a particular node. To measure traffic at a particular router, two datagrams sent by that router are received. The difference in the value of the identification fields 210 is computed as an indication of the number of datagrams sent by that router in between those two datagrams. The difference can be divided by the time between those two datagrams to determine the rate at which datagrams are being processed by the node.

When a node is at the end of the network, the difference in ID values is a good indication of the number of messages sent by the node. If the node is an internal node, such as a router, some part of the message traffic handled by that node comes from datagrams that are received by the node and forwarded on. When datagrams are forwarded on, the value in the ID field is not changed and these datagrams are not reflected in the count that results from finding the difference between ID values in two datagrams.

However, even nodes that simply forward messages to other nodes process network control messages. These messages mainly consist of ICMP and SNMP messages. We have recognized that the number of such control messages sent is proportional to the total number of datagrams processed by the node. Thus, the difference in ID values between two datagrams is proportional to, or reflective of, the total message traffic handled by the node. The proportionality factor might be different than in the case of a terminal node in the network. However, differences in values in the ID fields in datagrams sent by a particular node is an indictor of message traffic at that node.

Thus, one way to determine traffic loading is to cause a node to send two datagrams separated in time and then to determine the change in the value in the ID field.

Field 212 is a time to live field and, in the preferred embodiment, is used to cause nodes to send datagrams. In the IP protocol, time to live is an 8 bit field. In normal communications, it is set by the computer originating a datagram to have a value between 1 and 255. However, a value of 64, 128 or 255 is most often used. In the IP protocol, the time to live field represents the number of "hops" that a datagram can make. A "hop" means that the datagram is passed from one node to another.

Each time a datagram is passed from one node to another, the datagram that is passed on by the node has a time to live field that is one less than the incoming datagram. When a node receives a datagram with the time to live field decremented to 1, it does not pass the datagram on to another router. Rather, the node generates a new message, using datagrams according to the IP protocol. The message indicates that the datagram expired or timed-out without reaching its destination.

The time-out message has as its source address the address of the node at which the message timed out. The destination address is the computer that originally sent the datagram. The data in the message indicates which datagram timed out. Ordinarily, a node receiving a time out message would retransmit the appropriate datagram. However, as will be described herein, the node measuring Internet router traffic will, rather than resend a datagram, use the data in the timeout message to determine traffic at specific routers in the network.

To measure traffic, time to live field 212 can be set to a value that causes the datagram to time out at a particular node in the network that is being tested. This setting will cause a time out at a node will cause that node to generate a message, in this case a "time out" or "datagram expired" message. The message generated by the node provides information that allows the traffic at that node to be determined.

In the illustrated embodiment, the time out message includes a datagram that is sent by the node under test. When IP protocol is being used on the network, the datagram for the time out message will have the format of FIG. 2. In particular, it will include an ID field 210. As discussed above, the ID field is generally set by a counter that is incremented each time a datagram is sent by a router. By examining two different messages originated by the same source node, it is usually possible to determine the number of datagrams that have been sent by that node in between those two datagrams by computing the difference in ID fields.

Figure 3:
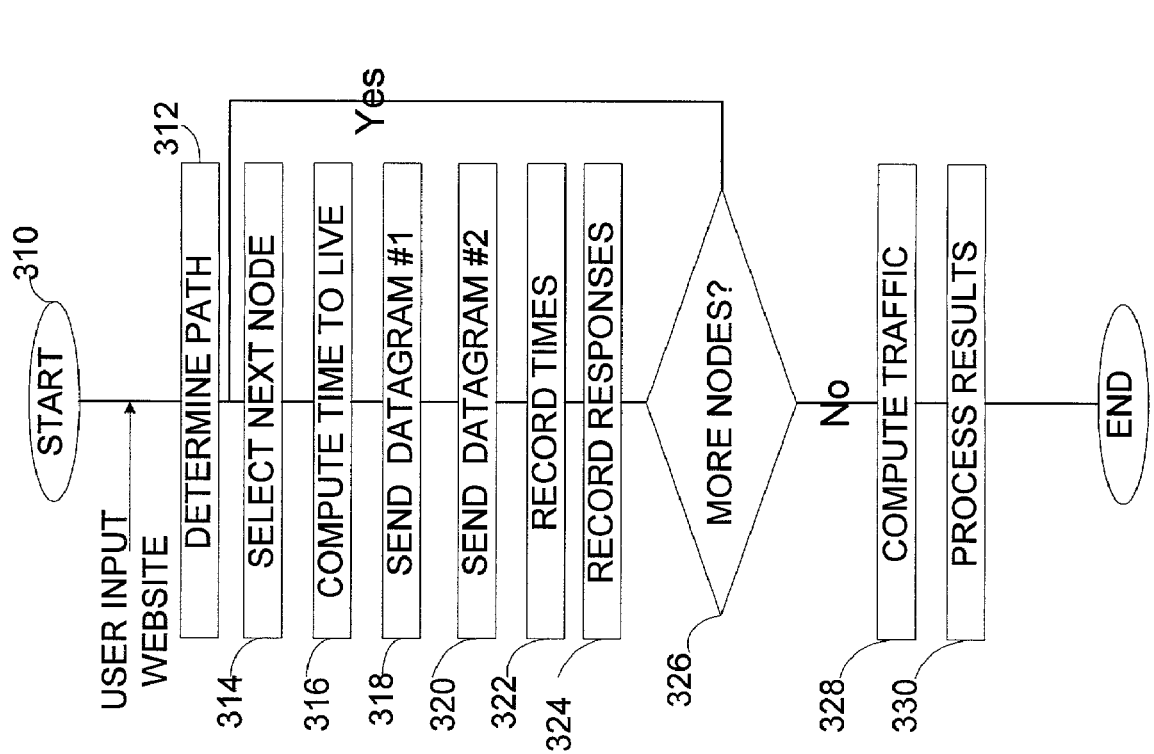
FIG. 3 is a flow chart of a method according to the invention.

FIG. 3 shows a flow chart of a process used to respond to a customer complaint concerning slow service in a network as shown in FIG. 1. In the example, the customer using PC 115 is attempting to reach a web site hosted on server 150, but is experiencing slow response. The customer calls the call center 160 for his ISP. At the call center, the operator learns that the customer is experiencing slow responses when trying to access a particular server. The call center operator directs the customer on how to communicate the name of that server to IDU 110.

In a preferred embodiment, the call center operator gives the customer the network address, or URL, of IDU 110 along with a password to access IDU 110. The consumer accesses IDU 110 over the network. IDU 110 prompts the user for the destination address, or URL, of the server 150 that the customer was trying to access.

IDU 110 then runs a test program. The test program likely includes multiple tests that verify the connection between PC 115 and ISP 130. It might, for example, send instructions that cause PC 115 to upload or download data to IDU 110.

If the connection is verified, IDU 110 can execute further test programs that attempt to determine whether the consumer's problem is the result of too much traffic at a particular node within the Internet 140. FIG. 3 illustrates one such test.

The test to determine traffic loading at nodes within the Internet 140 begins at step 310. The user provides as input the URL of the website that could not be accessed.

At step 312, the path through Internet 140 is traced. Known tools can trace the path. "Trace Route" is one such tool. IDU 110 can use this tool to determine the path.

The path from a source node to a destination node is not always the same. In some cases, hardware problems or other factors will cause the routing of datagrams through the network to change. But, datagrams from the same source to the same destination sent close together in time often follow the same path. However, step 312 might include running trace route tool multiple times to verify that the same path is being used for messages. Where it is determined that different paths are used, it might be necessary to repeat the process of FIG. 3 multiple times until a complete set of measurements is obtained for each path.

Once a path is determined, a traffic load test will be run on each node in the path. At step 314 a node in the path is selected for testing. Generally, the paths will be tested in the order in which they appear in the path, but no particular order is required.

At step 316, IDU 110 computes the time to live that will cause a datagram to time out at the selected node. Where the datagrams are in IP protocol, the time to live field 212 can be set based on the number of "hops" between IDU 110 and the selected node. A "hop" means that a message is passed from one node to another along the path. As each successive node in the path is selected for testing, the time to live field is incremented.

At step 318, a datagram is sent. At step 320, as second datagram is sent. Both will contain as a destination the address of the server that the user reported trouble accessing. Both will also contain the time to live value computed at step 316. Both will also include the URL of IDU 110 in the source field. The actual values in many of the fields will not matter, but the datagrams are preferably the same, except that they have different values in the ID field.

The main difference between the datagrams is the time at which they are sent. They will be separated by a short period of time. Preferably, the time should be long enough that the node under test will send a statistically sufficient number of datagrams. Measuring over a longer period of time leads to a more accurate average. However, messages on the network have identification fields with a finite number of bits. Eventually, the field will "overflow" and the sequence of values in the identification field will repeat. If too long a period elapses between datagrams, it will not be possible to know how many times the sequence of values has repeated. Consequently, the difference in the value of the fields will not be a true indication of the number of datagrams sent between the two datagrams.

In a preferred embodiment, the time interval between successive datagrams is on the order of 500 milliseconds. More preferably, the interval can initially be set to a small value. Pairs of datagrams can be sent, with successively longer time between the datagrams. The interval can be increased until the difference in ID values in the time out messages equals a significant fraction of the maximum value that can be placed in the ID field. For example, if the ID field has 16 bits, the maximum value it can hold is $2^{16}$. The time interval might be increased until some maximum time was reached. For example, the interval might be increased from 100 milliseconds to 2 seconds. Or the time could be increased until difference in values in the ID field reached $2^{15}$—or half of the maximum in the example.

At step 322, a record is made of the times at which the datagrams are sent. Preferably, the times will be stored in computer memory associated with the IDU.

Based on the value in the time to live field of the sent datagrams, the datagrams should expire at the node under test. The node under test should thererfore send back a message indicating that the datagram expired at that node. The datagram transmitting this message is received at the IDU 110. At step 324, the response is recorded. In particular, the ID field of the response datagram is recorded.

At decision block 326, a check is made of whether there are more nodes in the path. The process starting at step 314 is repeated for each node in the path to be tested. When it is ultimately determined that there are no more nodes to test, the process continues at step 328. When the process reaches step 328, IDU 110 will have stored a time interval between two datagrams for each node. There will also be a value from the ID field in datagrams from the two timeout messages sent by each node under test. At step 328, these values can be used to compute traffic at each node.

In the preferred embodiment, the traffic is computed as the ratio of the number of datagrams sent to the length of the time interval during which they were sent. The time interval is the time between the sending of the pair of datagrams at steps 318 and 320. This time interval is an acceptable approximation of the interval between the sending of the time out messages by the node under test.

The number of messages sent by the node under test in that interval is determined from the time out messages send by each node. In the preferred embodiment, this value is extracted from the ID field of the datagrams. In most implementations of the IP protocol, an ID counter is increased for every datagram sent. Thus, when a new datagram is created, a unique value is loaded in the ID field. But, the value represents a count of total datagrams sent.

Even though the interpretation of the bytes in identification field 210 is prescribed by the network protocol, we have observed that some computers will load the identification value into this field most significant byte first. Others will load the most significant byte last. Thus step 328 requires that the order of the bytes in field 210 be determined.

As indicated above, the time between the first datagram and the second datagram sent at steps 318 and 320, respectively, is preferably started small enough that the number of datagrams sent by the node under test in that interval will be a fraction of the maximum value of the ID field. This constraint allows the most significant byte of the ID field to be easily determined. The low order bytes should change, but the most significant byte should not.

To determine byte order, the ID fields in the two time out message datagrams are combined using the XOR operation. This operation creates a logic 1 in any bit position where the two numbers differ and a 0 in any bit position where the two numbers are the same. Thus, it will indicate which byte positions changed. If the first byte in the field changed, then the field is loaded least significant byte first. On the other hand, if the last byte in the field changed, the field is loaded most significant byte first. In the rare case when both the first and the last bytes changed, the measurement might be repeated. Upon a repeat, the interval between datagrams sent at steps 318 and 320 might be decreased to reduce the chance that the value of the most significant byte in the ID field will change.

The order of bytes in the ID field is determined for each node under test. Once the order of the bytes is determined, the difference between the two values can be quickly computed by subtracting the value in the ID field in one message from the value in the same field of the other message. This difference reflects the number of datagrams sent by the node under test.

This number of datagrams was sent by the node under test in the interval between receipt of the first datagram and the second datagram sent at steps 318 and 320. The time interval between the sending of those datagrams can be taken as a good indication of the time difference between their receipt. Accordingly, the difference in the ID field values can be divided by the time stored at step 322 to create a value indicative of traffic at the particular node.

Figure 4:
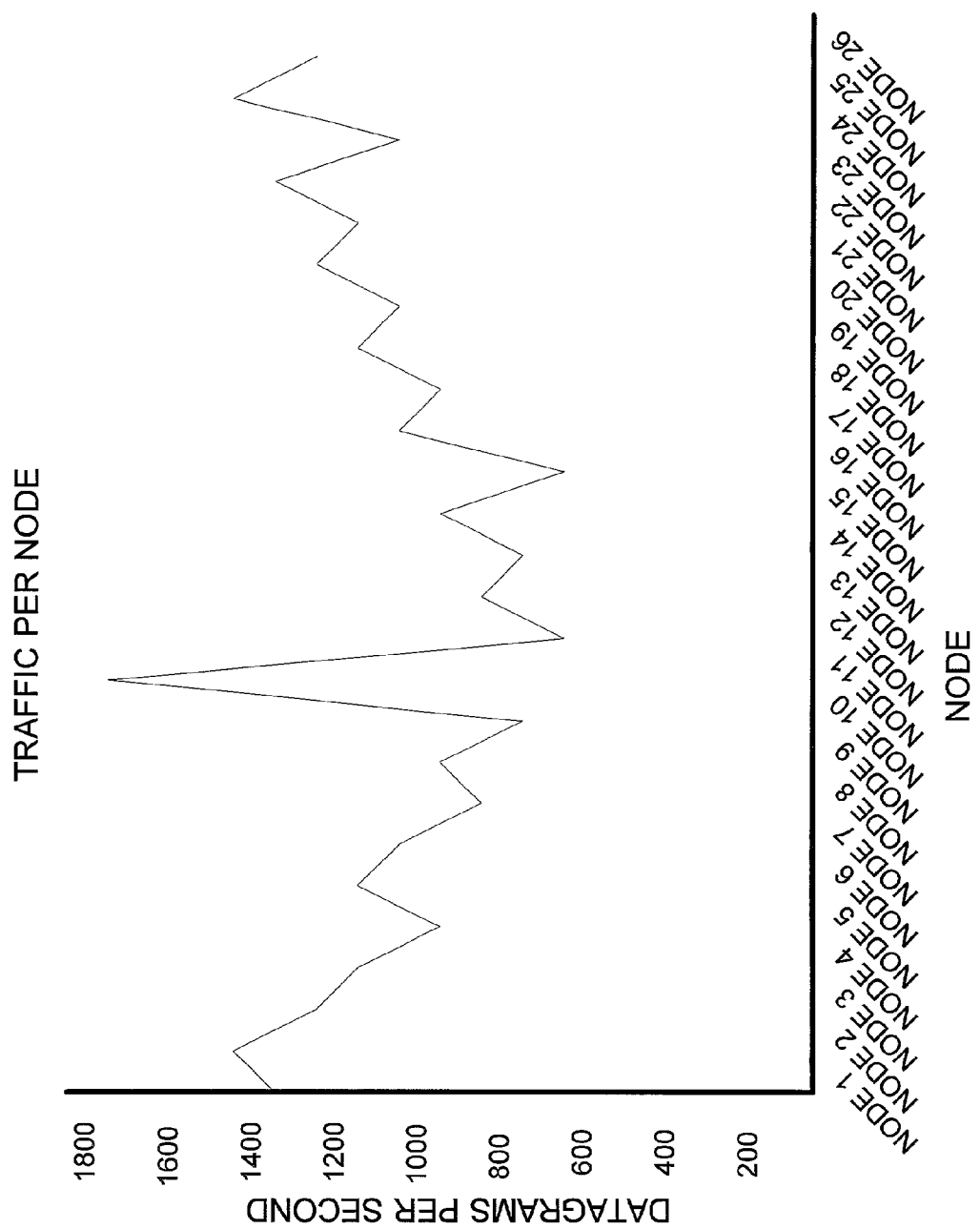
FIG. 4 is a sample data output for a test on a network path.

At step 330, the results are processed. The specific processing to be performed will depend on the way the information is to be used. One simple way the results might be processed is by displaying a graph of the traffic at each node in the path to the particular web site. FIG. 4 illustrates such a graph.

The horizontal axis illustrates the nodes in the path to the particular web site for which the consumer experienced problems. In FIG. 4, each node is identified simply by its order in the path, such as Node 1, Node 2 . . . . However, it should be appreciated that the URL of each node can be determined from the source address in the time out messages. Thus, additional information could be presented by indicating the URL of the node rather than its order.

The vertical axis is an indication of the number of datagrams processed by the particular node under test. In this case, the graph is presented in units of datagrams per second. However, it could be datagrams per minute or any other convenient unit. Alternatively, if recorded times at step 322 are the same for every node under test, the vertical axis could simply show the number of messages originated in the time between the sending of messages. In this case, the graph would show relative numbers of datagrams at each node, just not normalized to a time scale.

Such a graph might simply be presented to the consumer or the call center operator so that a human could analyze the results. For example, FIG. 4 indicates that Node 10 has much higher traffic than the other nodes in the path. If a customer is experiencing slow response from a web site, a traffic patter such as is shown in FIG. 4 indicates that a likely source of the problem is network congestion at Node 10.

Such processing could be automated. For example, once the traffic at each node under test is determined, the results could be searched for a node with greater traffic than the others as an indication of the source of the problem. Or a search could be made for nodes having a traffic level above a particular threshold. The threshold can be set by experience based on traffic levels measured when a consumer complains of a service problem. Or, the thresholds can be set based on knowledge of the state of the art in router or computer technology. It might, for example, be known that routers in a particular network on average process 800 messages per second. Message traffic above this rate might be used as an indication of a problem. Where data can be obtained about the hardware used to implement a particular node, the traffic at that node might be compared to a traffic value rated for that particular type of hardware to get a more accurate picture of whether the node is overloaded.

Information about whether particular nodes in a network are overloaded facilitates provision of higher levels of service. On the one hand, knowing that high traffic on a particular node is interfering with customer usage might allow the call center operator to make adjustments. The administrator of the node might be contacted to search for hardware problems on that node. Even if the problem can not be corrected because it resides in a different administrative domain where the consumer and call center operator do not have administrative privileges, knowing that the problem is not the fault of the consumer or the ISP can be a great time savings to each. Saving time for a call center operator can translate into a cost savings for the ISP or access provider running the call center.

On the other hand, knowing that a customer's service problem is not caused by router traffic can be an indication that further effort should be expended trying to locate and correct the problem. In locating a problem, the order in which tests are run is usually dictated by a combination of the likelihood that the test will reveal the source of the problem and the cost associated with doing the test. Thus, it will often be desirable to rule out Internet congestion as the source of the problem before running tests on the underlying hardware of the ISP or access provider network. Some such tests might, for example, require a technician be dispatched to check connections or initiate hardware tests. The above-described test to measure router traffic might be conducted on the order of minutes and would therefore provide significant savings if it avoided the need for a very expensive dispatch of a technician or other more intrusive testing.

A significant benefit of the above-described system is that a problem within a particular administrative zone can be detected without administrative privileges or specific knowledge of the network topology in that zone. In the described example, a consumer and a call center operator associated with an ISP can detect a problem within the public Internet.

Having described one embodiment, numerous alternative embodiments or variations might be made. For example, it was described that both the access provider network and the ISP network communicate using an IP protocol so that messages may pass from PC 115 to a server 150. One of skill in the art will understand that there are multiple protocol layers in a communications network. The protocol layer is one such layer. Below this layer is a physical layer. Even where the same protocol is used, different physical layers could be present. For example, it is not necessary that the access provider network be DSL. Datagrams could be carried over a traditional analog phone line and converted to digital form by a modem at ISP network 130. The principle underlying the invention would still be the same regardless of the physical medium used to carry communications.

Likewise, the higher level layers of the network are not important to the invention. The protocol layer is intended to carry datagrams for any type of application.

Further, it should be appreciated that IP protocol has been used to illustrate the invention because it is a widely used protocol. Other protocols that allow a message to time out at various nodes could be used. As with the IP protocol, the time to live might be specified based on the number of hops a data gram should be allowed before the datagram expires. Or, the time to live might be specified based on a time when the message expires. For example, one could imagine a network in which each node has a local clock that is occasionally synchronized to a master clock. The time to live field could be specified as a time on the local clock.

In that case, even with the same initial time to live setting, the node at which the message timed out would depend on delays in the network or other factors. To ensure adequate data was collected, it might be necessary to send multiple datagrams with slightly different time to live values to ensure multiple messages were received from each node.

More generally, the described method could be used with any protocol in which a node can be made to respond with a message giving some indication of the number of messages it has processed in some time period.

Also, it should be appreciated that the invention is described assuming datagram ID's are set by the IP protocol layer. This is not a limitation on the invention and the disclosed method could work even if the message ID is set by an application layer.

As an example of other possible variations, it was described that IDU 110 is connected to the ISP network. IDU 110 could also be connected to the access provider network 120 or at other convenient locations in Internet 100.

Moreover, it is not necessary that the method for measuring router loading be run on an IDU. Computer software to execute the required measurements could run on almost any computer connected to the network. In particular, it could be loaded on consumer PC 115. The software might be permanently installed on consumer PC 115 or downloaded to PC 115 only when needed.

Also, the method was explained in the context of measuring traffic at routers. It should be appreciated that the technique could be used with other types of message passing nodes in a network. For example, switches, bridges or other types of nodes might also respond in the same way and allow an estimate of message traffic to be made.

Also, in the examples, traffic is presented as a number of datagrams per unit time. The traffic might be described in other ways. For example, the traffic might be expressed as a percentage of the number of messages that a node could carry in a certain time interval. Regardless of how the results are expressed, they can be a useful indicator of traffic if they are deterministically related to the number of datagrams processed by the node under test.

Also, it should be appreciated that the number computed by taking the difference in the value in ID fields in two datagrams gives an indication of the message traffic handled at that node, rather than an actual count of the messages. This number might be processed in any number of ways before presenting it to a user. It might, for example, be scaled by a factor representing the ratio of control datagrams generated by a router to the total number of datagrams processed by the router. Such factors might be determined empirically. It is possible that different ratios could be applied depending on the specific node. For example, nodes at the edge of the networks would likely be scaled by different factors than routers at the interior of the network.

As a further variation, it should be noted that determining a path and selecting nodes in a path are different steps. It is not necessary that these steps be done separately. The steps could be combined, such as by taking the messages used to detect the path as the first of the messages used to computer number of messages sent at a node.

Additionally, it was assumed that the order of bytes in the ID field was unknown. Accordingly, part of the method described above included a determination of byte order in the ID field. Where the order is known in advance, that step is not required. Thus, that step is not essential to the process.

Other variations in the locations of the sending and processing of messages are possible. For example, a consumer computer might send a message causing the node under test to generate the time out message. But, the time out messages might be intercepted by the IDU 110 and the responses could be processed at that time. Additionally, the IDU might monitor the messages sent by the consumers computer and determine the time at which they were sent to be able to compute the time interval between the timeout messages.

Therefore, the invention should be limited only by the spirit and scope of the appended claims.

What is claimed is:

1. A method of measuring traffic at a node under test in a network, comprising:
    a) sending a plurality of first type datagrams from a source node, each first type datagram having a path through the network including the node under test, each first type datagram causing the node under test to generate a second type datagram, and each second type datagram having a path through the network that includes the source node;
    b) processing at least two of the second type datagrams to determine a number of datagrams processed by the node under test between the at least two of the second type datagrams;
    c) determining the time between the at least two of the second type datagrams; and
    d) computing a traffic value reflecting the ratio between the determined number of messages and the determined time wherein causing the node under test to generate a second type datagram includes setting a time to live field in the first type datagram that causes the datagram to expire upon reaching the node under test.

2. The method of claim 1 wherein the second type datagram is part of a message indicating that a datagram expired.

3. The method of claim 1 wherein the source node is a consumer computer.

4. The method of claim 1 wherein the source node is a diagnostic unit connected to a call center.

5. The method of claim 4 wherein the diagnostic unit is in a different administrative domain than the node under test.

6. The method of claim 4 wherein the first type datagrams have a destination address representing a server for which a customer experienced problems accessing.

7. The method of claim 1 used in a method of responding to a customer complaint about slow access to the Internet, additionally comprising:
    a) receiving from the customer a URL;
    b) selecting the node under test based on the designated URL;
    c) reporting to the customer based on the results of the measured traffic.

8. The method of claim 1 additionally comprising:
    a) selecting a path through the network having a plurality of nodes;
    b) measuring the traffic at the plurality of nodes according to the method of claim 1.

9. The method of claim 1 wherein the first type datagram is in IP protocol.

10. The method of claim 1 wherein the second type datagrams are in IP protocol and processing the second type datagrams includes computing the change in the value of the identification fields in the datagrams.

11. The method of claim 1 wherein the second type datagram is part of a time out message.

12. The method of claim 1 wherein the value reflecting the computed traffic value is an average of values obtained from processing multiple pairs of second type datagrams.

13. A method of measuring traffic at a node under test in a network, comprising:
   a) sending a pair of first type datagrams from a source node separated by a time interval, each of the first type datagrams having a path through the network including the node under test; each of the first type datagrams having a time to live field causing the datagram to expire at the node under test, thereby causing the node under test to generate a timeout message in response to each first type datagram;
   b) processing the timeout messages to determine a number of datagrams processed by the node under test between the timeout messages;
   c) computing a traffic value reflecting the number of datagrams processed by the node under test in the time interval.

14. The method of claim 13 wherein the first type datagrams are in IP protocol.

15. The method of claim 13 wherein the source node is a diagnostic unit associated with a call center.

16. A method of measuring traffic at nodes on a path through a network, comprising, for each node in the path:
   a) sending a pair of first type datagrams from a source node separated by a time interval, each of the first type datagrams having a path through the network including the node under test, each of the first type datagrams having a time to live field causing the datagram to expire at the node under test, thereby causing the node under test to generate a timeout message in response to each first type datagram;
   b) processing the timeout messages to determine a number of datagrams processed by the node under test between the timeout messages;
   c) graphically displaying the results of the processing in a graph showing traffic on a node by node basis.

17. The method of claim 16 additionally comprising selecting the path through the network in response to a consumer complaint about accessing a node in the network.

18. The method of claim 16 wherein processing the timeout messages includes computing the difference in the value of the ID fields in the messages.

19. The method of claim 18 wherein processing the timeout messages determining the ratio between the difference in the values of the ID fields and the difference in times at which the messages in the pair of first type datagrams are sent.

* * * * *